(12) United States Patent
Belleau et al.

(10) Patent No.: US 9,464,663 B2
(45) Date of Patent: Oct. 11, 2016

(54) BALL JOINT (75) Inventors: Ryan Mark Belleau, St. Catharines (CA); Mike Holierhoek, Grimsby (CA)

(73) Assignee: THK RHYTHM AUTOMOTIVE GmbH, Deuesseldorf (DE)

( * ) Notice: Subject to any disclaimer, the term of this patent is extended or adjusted under 35 U.S.C. 154(b) by 0 days.

(21) Appl. No.: 14/116,348

(22) PCT Filed: May 10, 2012

(86) PCT No.: PCT/US2012/037240
§ 371 (c)(1),
(2), (4) Date: Mar. 6, 2014

(87) PCT Pub. No.: WO2012/154916
PCT Pub. Date: Nov. 15, 2012

(65) Prior Publication Data
US 2014/0212204 A1    Jul. 31, 2014

Related U.S. Application Data (60) Provisional application No. 61/484,339, filed on May 10, 2011.

(51) Int. Cl.
*F16C 11/06* (2006.01)
*F16C 11/08* (2006.01)
*B60G 7/00* (2006.01)

(52) U.S. Cl.
CPC ............. *F16C 11/08* (2013.01); *B60G 7/005* (2013.01); *F16C 11/0623* (2013.01);
(Continued)

(58) Field of Classification Search
CPC .. B60G 7/005; B60G 2204/416; B62D 7/16; B62D 7/163; B62D 7/166; F16C 11/0623; F16C 11/0628; F16C 11/0633; F16C 11/0638; F16C 11/0642; F16C 11/0647; F16C 11/0652; F16C 11/0657; F16C 11/08; F16C 11/083; F16C 11/086
USPC ........ 403/114, 115, 122, 133, 134, 135, 143
See application file for complete search history.

(56) References Cited

U.S. PATENT DOCUMENTS 3,090,642 A * 5/1963 Gottschald et al. .......... 403/135
3,527,316 A * 9/1970 Jones, Jr. et al. ............. 403/134
(Continued)

FOREIGN PATENT DOCUMENTS

DE          852022 C     10/1952
DE       1958197 A1 *   6/1970  ........... B60B 35/003

OTHER PUBLICATIONS

Chinese 1st Office Action, Application No. 201280030081.9 dated Jun. 30, 2015.

*Primary Examiner* — Josh Skroupa
(74) *Attorney, Agent, or Firm* — Westerman, Hattori, Daniels & Adrian, LLP (57) ABSTRACT

An improved ball joint for use in a motor vehicle steering or suspension system includes a housing, a bearing disposed in the housing, and a ball stud supported within the housing by the bearing. The bearing includes at least a first bearing member formed from a first material and a second bearing member formed from a second dampening material attached to at least a portion of an outer surface of the first bearing member. The first bearing member has a bidirectional slot formed therein which is configured to allow the ball stud to articulate in a first direction and restrict and dampen articulation in a second direction which is generally transverse to the first direction.

2 Claims, 5 Drawing Sheets

(52) U.S. Cl.
CPC ........ *F16C 11/0638* (2013.01); *F16C 11/086* (2013.01); *B60G 2204/416* (2013.01); *Y10T 403/32573* (2015.01); *Y10T 403/32631* (2015.01); *Y10T 403/32721* (2015.01); *Y10T 403/32737* (2015.01)

(56) References Cited

U.S. PATENT DOCUMENTS

| | | | |
|---|---|---|---|
| 3,647,249 A * | 3/1972 | Baba et al. | 403/140 |
| 3,790,195 A | 2/1974 | Herbenar | |
| 3,958,904 A * | 5/1976 | Rusbach | 403/90 |
| 4,324,501 A * | 4/1982 | Herbenar | 403/135 |
| 4,613,251 A * | 9/1986 | Bellamy et al. | 403/135 |
| 4,679,957 A * | 7/1987 | Bauer | 403/115 |
| 4,725,159 A * | 2/1988 | Wood, Jr. | 403/135 |
| 6,454,484 B1 * | 9/2002 | Parker et al. | 403/132 |
| 7,083,356 B2 * | 8/2006 | Paduano | 403/144 |
| 7,100,881 B2 * | 9/2006 | Worrall | 403/115 |
| 7,261,487 B2 | 8/2007 | Urbach | |

* cited by examiner

BALL JOINT

CROSS-REFERENCE TO RELATED APPLICATIONS

Background of the Invention

This invention relates in general to vehicle steering or suspension systems and in particular to an improved ball joint for use in such a motor vehicle steering or suspension system.

Ball joints provide an articulated connection between two relatively movable parts. Ball joints are commonly used in motor vehicle steering systems and in motor vehicle suspension systems.

In a vehicle steering system, ball joints are commonly adapted to be connected to a steering arm of each of a wheel knuckle. Typically, a ball joint for a motor vehicle steering system includes a ball stud with a spherical ball end and a housing or socket member with a spherical socket. A bearing member in the socket receives the ball end and supports the ball end for rotational and pivotal movement. Such a steering system having a ball joint is disclosed in U.S. Pat. No. 7,261,487 B2 to Urbach, the disclosure of this patent incorporated by reference herein in entirety.

SUMMARY OF THE INVENTION

This invention relates to an improved ball joint for use in such a motor vehicle steering or suspension system.

According to one embodiment, the ball joint comprises: a housing; a bearing disposed in the housing; and a ball stud supported within the housing by the bearing; wherein the bearing includes at least a first bearing member formed from a first material and a second bearing member formed from a second dampening material attached to at least a portion of an outer surface of the first bearing member, the first bearing member having a bidirectional slot formed therein which is configured to allow the ball stud to articulate in a first direction and restrict and dampen articulation in a second direction which is generally transverse to the first direction.

According to this embodiment of the ball joint, the bidirectional slot includes a first slot portion having a first shape and a second slot portion having a second shape different from the first shape.

According to this embodiment of the ball joint, the first shape of the first slot portion is generally oval-shaped and the second shape of the second slot portion is generally concave shaped.

According to this embodiment of the ball joint, the first slot portion is generally in the center of the bearing and the second slot portion is formed by a pair of generally concave shaped slots disposed on opposed sides of the first slot portion.

According to this embodiment of the ball joint, the bearing includes an opened first end having a first opening formed therein and an opposite opened second end having a second opening formed therein which is different from the first opening.

According to this embodiment of the ball joint, the ball stud includes a ball portion and a pin portion, wherein the pin portion is disposed in the first slot portion and the ball portion is disposed in the second slot portion.

According to this embodiment of the ball joint, the second bearing member is secured to substantially the entire outer surface of the first bearing member.

According to this embodiment of the ball joint, the first bearing member is formed from one of metal or plastic and the second bearing member is formed from one of rubber or plastic.

According to this embodiment of the ball joint, the second direction defines a minor axis of the ball joint such that when the ball joint is impacted with loads in the direction of the minor axis the first bearing member partially unseats from a portion of a housing internal counterbore whereby the second member is operative to dampen the loads into the ball joint.

According to another embodiment, a ball joint comprises: a housing having a chamber; a bearing disposed in the chamber of the housing; and a ball stud supported within the chamber of the housing by the bearing; wherein the bearing includes a first bearing member formed from a first material and a second bearing member formed from a second dampening material and attached to at least a portion of an outer surface of the first bearing member, the first bearing having a first slot portion and a second slot portion formed therein, wherein the first slot portion is configured to allow the ball stud to articulate in a first direction and the second slot portion is configured to restrict and dampen articulation in a second direction which is generally transverse to the first direction.

According to this embodiment of the ball joint, the first slot portion has a first shape and a second slot portion has a second shape different from the first shape.

According to this embodiment of the ball joint, the first shape of the first slot portion is generally oval-shaped and the second shape of the second slot portion is generally concave shaped.

According to this embodiment of the ball joint, the first slot portion is generally in the center of the bearing and the second slot portion is formed by a pair of generally concave shaped slots disposed on opposed sides of the first slot portion.

According to this embodiment of the ball joint, the bearing includes an opened first end having a first opening formed therein and an opposite opened second end having a second opening formed therein which is different from the first opening.

According to this embodiment of the ball joint, the ball stud includes a ball portion and a pin portion, wherein the pin portion is disposed in the first slot portion and the ball portion is disposed in the second slot portion.

According to this embodiment of the ball joint, the second bearing member is secured to substantially the entire outer surface of the first bearing member.

According to this embodiment of the ball joint, the first bearing member is formed from one of metal or plastic and the second bearing member is formed from one of rubber or plastic.

According to this embodiment of the ball joint, the second direction defines a minor axis of the ball joint such that when the ball joint is impacted with loads in the direction of the minor axis the first bearing member partially unseats from a portion of a housing internal counterbore whereby the second member is operative to dampen the loads into the ball joint.

According to another embodiment, a bearing for a ball joint comprises: a first bearing member formed from a first material and a second bearing member formed from a second dampening material attached to at least a portion of an outer surface of the first bearing member, the first bearing member having and first opened end portion, a main body portion, and a second end portion, wherein the first bearing member includes an inner bearing seat defined by a first slot portion and a second slot portion, wherein the first slot portion is configured to allow the ball stud to articulate in a first direction and the second slot portion is configured to restrict and dampen articulation in a second direction which is generally transverse to the first direction.

According to this embodiment of the bearing, the first slot portion has a first shape and a second slot portion has a second shape different from the first shape.

According to this embodiment of the bearing, the first shape of the first slot portion is generally oval-shaped and the second shape of the second slot portion is generally concave shaped.

According to this embodiment of the bearing, the first slot portion is generally in the center of the bearing and the second slot portion is formed by a pair of generally concave shaped slots disposed on opposed sides of the first slot portion.

According to this embodiment of the bearing, the second direction defines a minor axis of the ball joint such that when the ball joint is impacted with loads in the direction of the minor axis the first bearing member partially unseats from a portion of a housing internal counterbore whereby the second member is operative to dampen the loads into the ball joint.

Other advantages of this invention will become apparent to those skilled in the art from the following detailed description of the preferred embodiments, when read in light of the accompanying drawings.

DETAILED DESCRIPTION OF THE INVENTION

Referring now to FIGS. 1-4, there is illustrated an embodiment of a ball joint, indicated generally at 10, in accordance with the present invention. The general structure and operation of the ball joint 10 is conventional in the art. Thus, only those portions of the ball joint which are necessary for a full understanding of this invention will be explained and illustrated in detail. As is well known in the art, the ball joint 10 is configured to interconnect relatively movable vehicular parts, such as for example, a steering knuckle or steering yoke, with a control arm, steering yoke or steering knuckle, or other associated parts of the vehicle steering or suspension system. Also, although this invention will be described and illustrated in connection with the particular ball joint 10 disclosed herein, it will be appreciated that this invention may be used in connection with other kinds, types or designs of ball joints if so desired. For example, the ball joint 10 can be used in connection with a vehicle suspension system and/or a ball joint as shown in U.S. Pat. No. 6,042,294 to Urbach, the disclosure of this patent incorporated by reference herein in entirety.

As shown in FIGS. 1-5, the ball joint 10 includes a socket shell or housing 12 which defines an axis A, a first or upper "throat" bearing 14, a ball stud 16, a second or "lower" bearing 18 and a socket plug 20. In the illustrated embodiment, the housing 12 is formed from a suitable material, such as for example steel or plastic. The housing 12 includes an interior chamber 12A, an opened first or upper end 12B, and an opened second or lower end 12C. The housing preferably further includes an annular groove or recess 12D provided in an inner side wall thereof. Alternatively, the construction, configuration, or shape of the housing 12 can be other than illustrated and described if so desired.

In the illustrated embodiment, the first bearing 14 is formed from a suitable material, such as for example plastic or steel. The first bearing 14 is generally annular in shape and is configured to be disposed in the annular groove 12D provided in the inner side wall of the housing 12. Alternatively, the construction, configuration, or shape of the first bearing 14 can be other than illustrated and described if so desired.

In the illustrated embodiment, the ball stud 16 is formed from a suitable material, such as for example steel. The ball stud 16 is configured to be operatively centered on the axis A of the ball joint 10. The ball stud 16 includes a first or shank portion 16A, a second or ball portion 16B and a third or pin portion 16C. The shank portion 16A of the ball stud 16 is configured to be operatively connected or coupled to a suitable vehicle steering or suspension component, such as for example, a steering knuckle (not shown), in a known manner. For example, the shank portion 16A can be provided with external threads (not shown) used for connecting the shank portion 16A, and therefore the ball joint 10, to the associated vehicle component. Alternatively, the construction, configuration, or shape of the ball stud 16 and/or the method of connecting it to the associated vehicle component can be other than illustrated and described if so desired.

In the illustrated embodiment, the second bearing 18 preferably includes at least a first or "inner" member 22 and a second or "outer" member 24. The first member 22 is generally annular in shape and is formed from a suitable material, such as for example steel, plastic, brass, bronze, or phenolic. In the illustrated embodiment, the first member 22 is preferably formed from high strength low alloy steel, such as for example 50F or 70F stamped steel.

Figure 1:
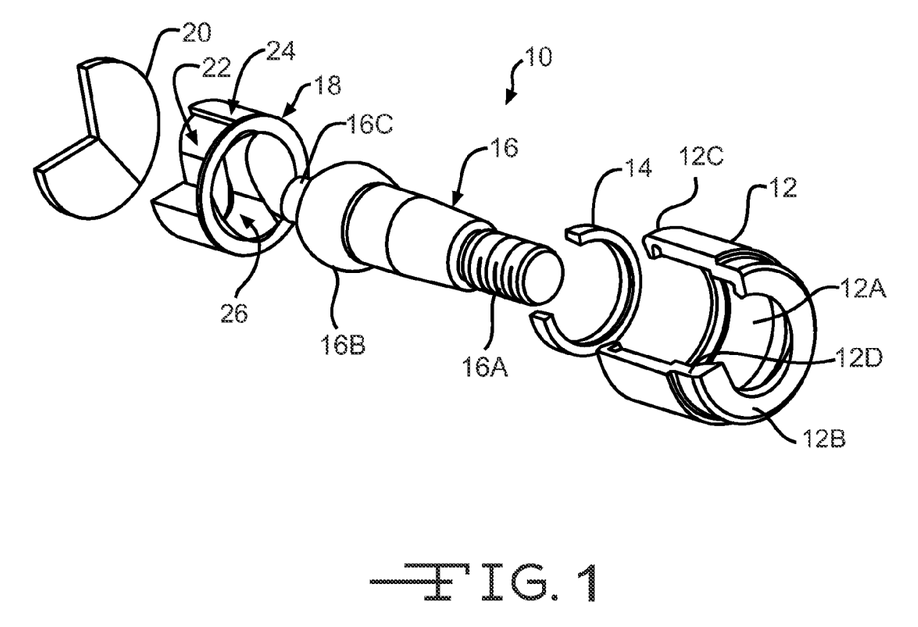
FIG. 1 is an exploded view, with portions cut away, of an embodiment of a ball joint in accordance with the present invention.
Figure 2:
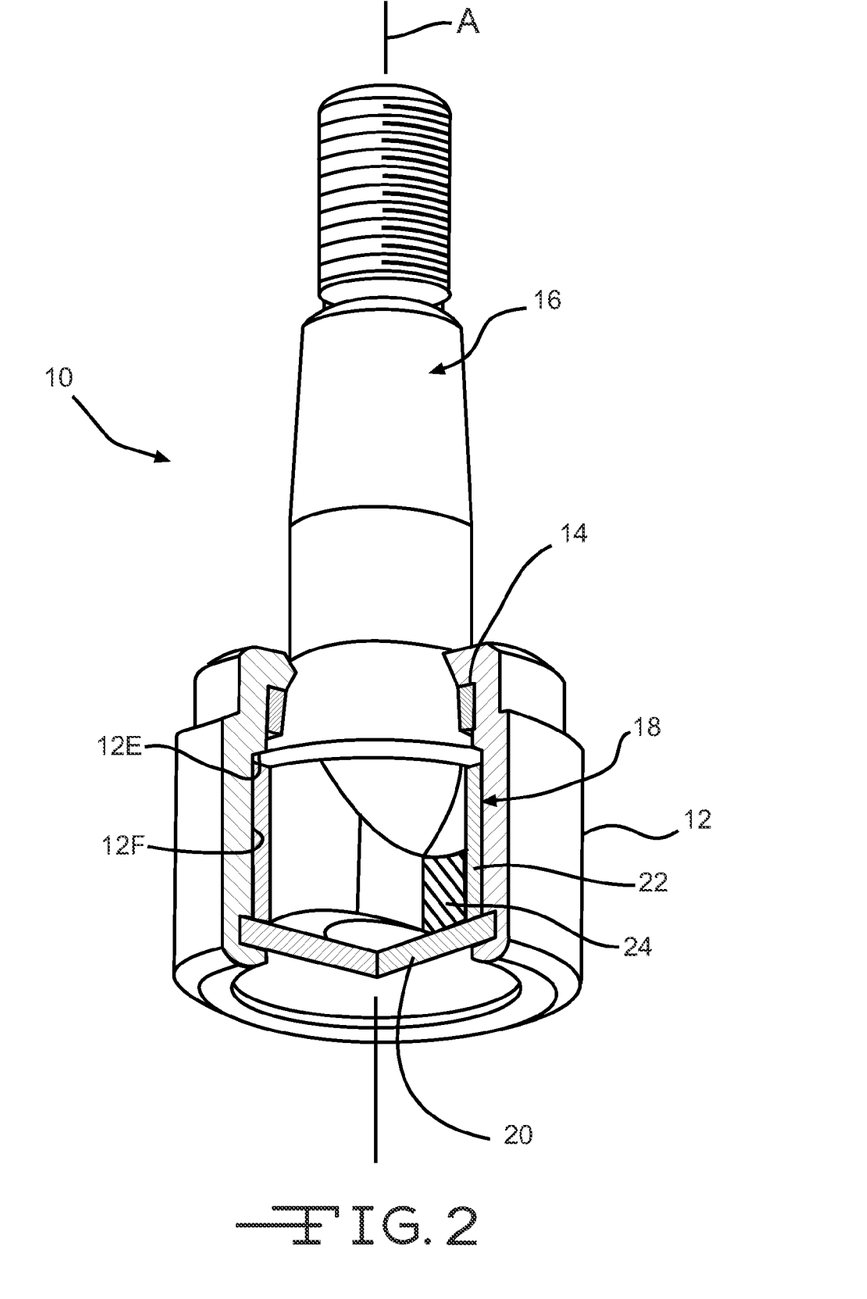
FIG. 2 is a sectional view, with portions cut away, of the ball joint.
Figure 3:
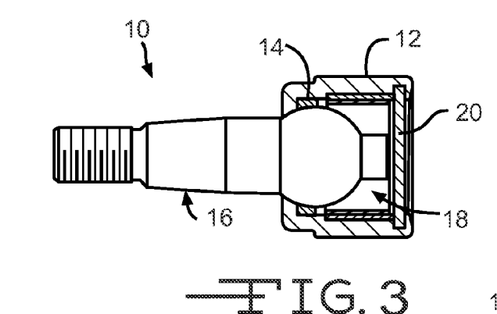
FIG. 3 is another sectional view of the ball joint.
Figure 4:
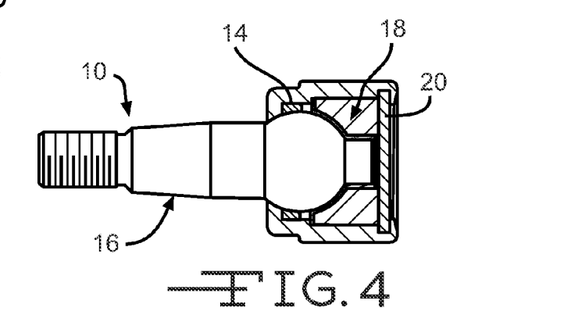
FIG. 4 is another sectional view of the ball joint.
Figure 5:
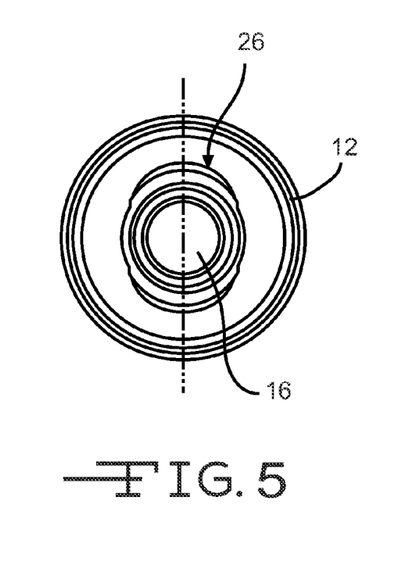
FIG. 5 is a view taken through a portion of the ball joint showing the possible allowable articulation of the ball joint.
Figure 8:
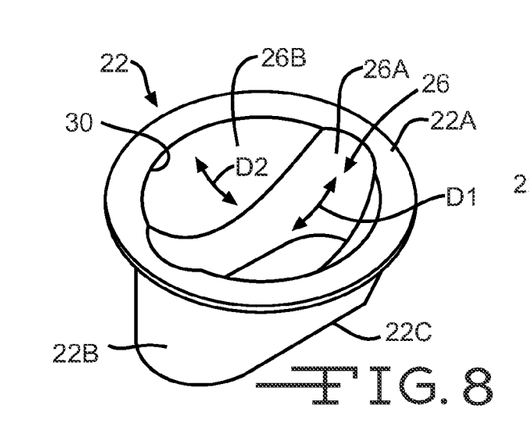
Figure 9:
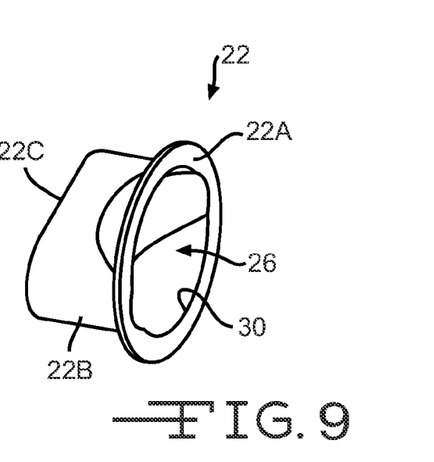
FIGS. 9-10 are view of the bearing without the damper of the ball joint.
Figure 10:
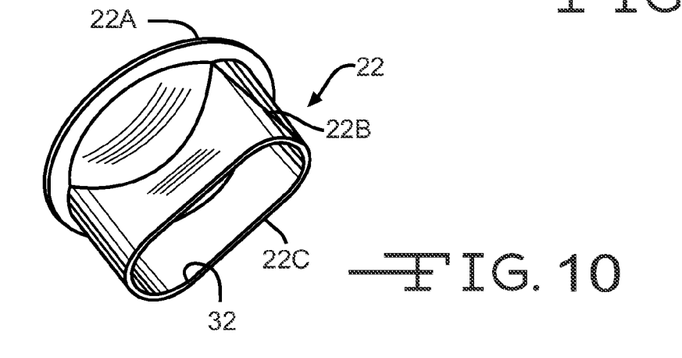

In the illustrated embodiment as best shown in FIGS. 8-10, the first bearing member 22 includes a first or "upper" flanged opened end portion 22A, a second or main body portion 22B, and a second or "lower" end portion 22C which preferably is also opened. The first member 22 further includes an "inner" bearing seat or surface, indicated generally at 26, extending generally from the upper end portion 22A to the lower end portion 22C. The upper end portion 22A includes a generally circular shaped opening 30 and the lower end portion 22C includes a generally oval shaped or elongated slot shaped opening 32. As best shown in FIG. 2, the flanged opened end portion 22A of the first member 22 is normally disposed adjacent and in engagement with a shoulder 12E of an internal counterbore 12F of the housing 12.

Figure 7:
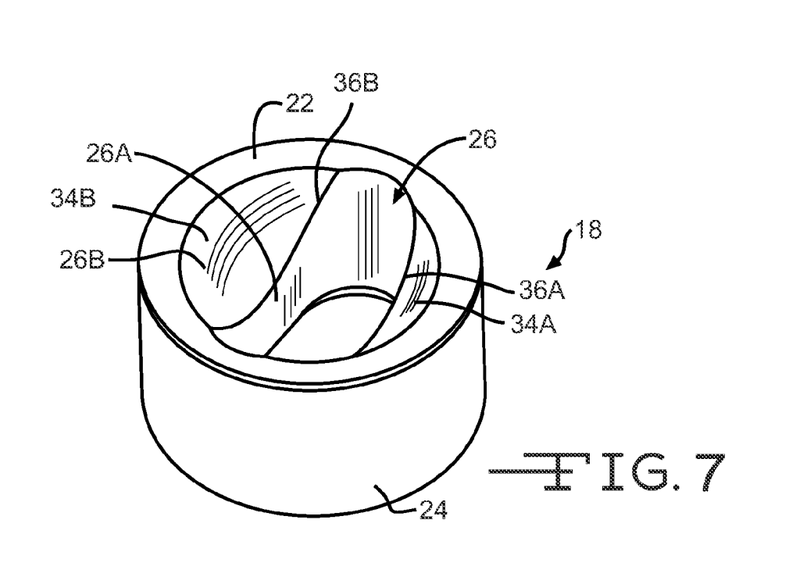
FIG. 7 is a view of the bearing with the damper of the ball joint.

In the illustrated embodiment, the bearing seat 26 of the first member 22 includes a uniquely shaped "bidirectional stud travel" slot which is configured to operatively receive the ball portion 16B and the pin portion 16C of the ball stud 16 therewithin. As can be seen best in FIGS. 7 and 8, in the illustrated embodiment the bidirectional slot includes a first slot portion 26A having a first shape and a second slot portion 26B having a second shape. The first slot portion 26A is formed generally in the center of the main body portion 22B of the first member 22 and is generally an oval-shaped slot.

In the illustrated embodiment, at least the opposed end portions the first slot 26A preferably extend generally the entire depth of the first member 22, i.e., extend generally from the flanged upper end portion 22A to the lower end portion 22C. As shown in the illustrated embodiment, the first slot portion 26A includes generally curved end walls and generally planar or flat side walls. In the illustrated embodiment, the first slot portion 26A is generally configured to receive and support the pin portion 16C of the ball stud 16 and controls the orientation of the ball stud 16 and allows the articulation of the ball stud 16 in a first direction, generally indicated by double headed arrow D1 in FIG. 8.

In the illustrated embodiment, the second slot portion 26B includes a pair of slots 34A and 34B which are formed in the main body portion 22B of the first member 22 on opposed sides of the first slot portion 26A. In the illustrated embodiment, the slots 34A and 34B are generally concave shaped, such as for example spherical. In the illustrated embodiment, the slots 34A and 34B preferably extend only partially the depth of the first member 22 of the second bearing 18, i.e., extend generally from the flanged upper end portion 22A toward the lower end portion 22C, as the slots 34A and 34B generally converge or merge with the first slot portion 26A as indicated by lines 36A and 36B, respectively, in FIG. 7.

In the illustrated embodiment, the second slot portion 26B is generally configured to receive and support the ball portion 16B of the ball stud 16 and allows the articulation of the ball stud 16 in the first direction D1, but via the pin portion 16C in the first slot portion 26A the articulation of the ball stud 16 is restricted in a second direction, generally indicated by double headed arrow D2. As can be seen in FIG. 8, the second direction D2 is generally opposite or transverse (i.e., 90 degrees), relative to the first direction D1. Thus, the bi-directional slot of the second bearing 18 is operative to allow directional ball stud 16 articulation in the first direction D1, while restricting the articulation in the second direction D2.

In the illustrated embodiment, the second member 24 of the second bearing 18 defines a bushing or damper and is preferably formed from a suitable material, such as for example preferably rubber but can be made from plastic. In the illustrated embodiment, the second member 24 is preferably provided and is bonded, glued, or otherwise permanently attached to an outer surface of the main body portion 22B of the first member 22. Preferably, the second member 24 covers the entire outer surface of the main body portion 22B of the first member 22. Alternatively, the construction, structure or configuration of the first member 22 and/or the second member 24 of the second bearing 18 and/or the method for attaching the second member 24 to the first member 22 can be other than illustrated and described if so desired.

Figure 6:
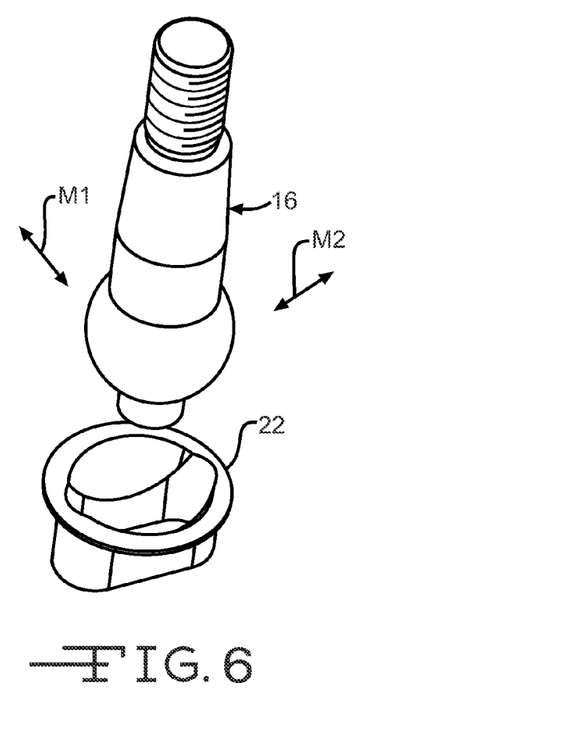
FIG. 6 is an exploded view of the bearing (without the damper) and ball stud of the ball joint.
Figure 11:
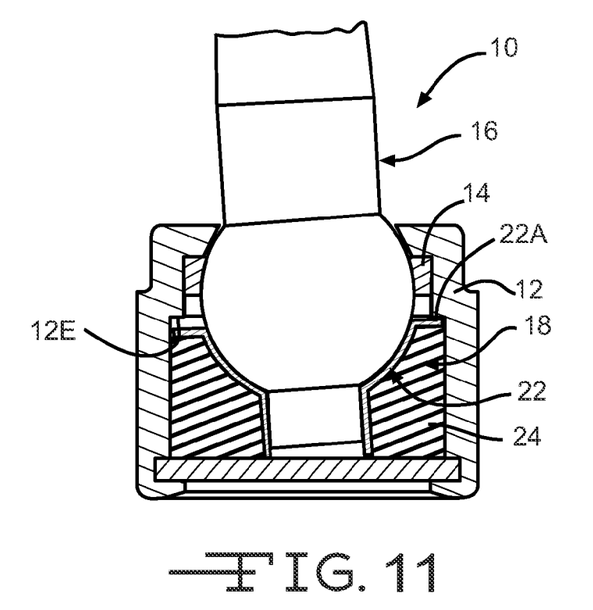
FIG. 11 is an enlarged view of a portion of the ball joint showing an operating condition of the ball joint.
Figure 12:
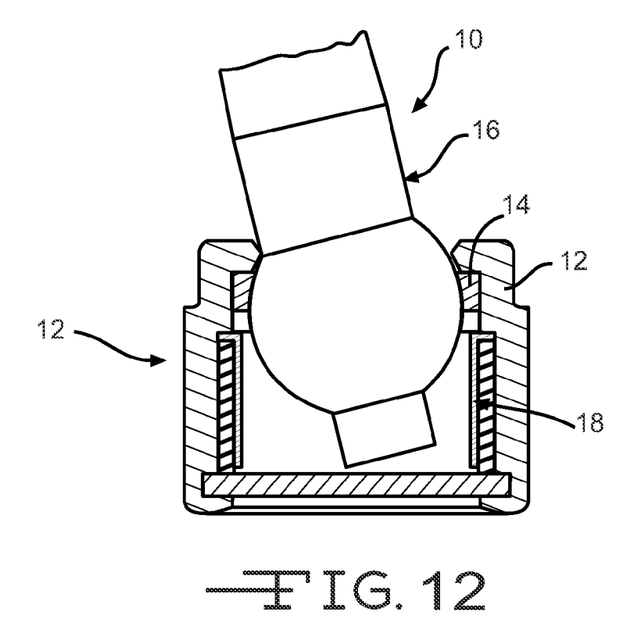
FIG. 12 is an enlarged view of a portion of the ball joint showing another operating condition of the ball joint.

One potential advantage of the illustrated embodiment of the invention is that ball joint second bearing 18—which preferably includes the stamped "thin wall" steel first member 22 having a dampening second member 24 attached thereto—allows directional stud articulation in one direction while generally restricting articulation in a generally opposite (i.e., ninety degrees). Also, during operation of the vehicle, as the ball joint 10 is impacted with loads in the "restricted stud" direction of a minor axis thereof (i.e., the direction of the minor axis (vehicle fore/aft) being shown in FIG. 6 generally by arrow M1), the rubber, plastic or similar "dampening" material of the second member 24 of the second bearing 18 allows the second bearing 18 to partially unseat from the shoulder 12E of the internal counterbore 12F of the housing 12 (as shown in FIG. 11), whereby the second member 24 is operative to absorb/dampen the loads into the ball joint 10. The second bearing 18 also allows the ball joint 10 to hang the associated steering linkage at an angle perpendicular or opposed to its center of gravity. The major axis (i.e., the major axis being shown in FIG. 6 generally by arrow M2), of the ball joint 10 allows for full ball stud 16 articulation in the major axis M2 in suspension jounce or rebound without any dampening (as shown in FIG. 12). As can be seen from FIGS. 6 and 8, the minor axis M1 of the ball joint 10 generally coincides or is in line with the second direction D2 of articulation of the ball stud 16 in the second bearing 18 and the major axis M2 of the ball joint 10 generally coincides or is in line with the first direction D1 of articulation of the ball stud 16 in the second bearing 18.

The principle and mode of operation of this invention have been described in its preferred embodiments. However, it should be noted that this invention may be practiced otherwise than as specifically illustrated and described without departing from its scope.

What is claimed is:

1. A ball joint comprising:
   a housing;
   a bearing disposed in the housing; and
   a ball stud supported within the housing by the bearing and having a ball portion provided with a pin,
   wherein the bearing includes at least a first bearing member and a second bearing member,
   the first bearing member being formed from a material which is one of metal and plastic, the first bearing member including a concave bearing surface at which the ball portion of the ball stud engages and a bidirectional slot into which the pin of the ball portion of the ball stud engages,
   the second bearing member being formed from a dampening material ached to at least a portion of an outer surface of the first bearing member, and
   the bidirectional slot formed in the first bearing member allowing the ball stud to articulate in a first direction, an articulation of the ball stud in a second direction which is generally transverse to the first direction being restricted and dampened as a result of the pin engaging into the slot of the first bearing member and the first bearing member being displaceably supported in the housing by means of the second bearing member.

2. A ball joint comprising:
   a housing;
   a bearing disposed in the housing; and
   a ball stud supported within the housing by the bearing and having a ball portion provided with a pin;
   wherein the bearing includes at least a first bearing member and a second bearing member,
   the first bearing member being formed from a material which is one of metal and plastic, the first bearing member including a concave bearing surface at which the ball portion of the ball stud engages and a bidirectional slot into which the pin of the ball portion of the ball stud engages, the second bearing member being formed from a dampening material attached to at least a portion of an outer surface of the first bearing member, the bidirectional slot formed in the first bearing member allowing the ball stud to articulate in a first direction, an articulation of the ball stud in a second direction which is generally transverse to the first direction being restricted and dampened as a result of the pin engaging into the slot of the first bearing member and the first bearing member being displaceably supported in the housing by means of the second bearing member, the first bearing member being adapted for being partially unseated from a portion of a housing internal counterbore whereby the second member is operative to dampen the loads into the ball joint when the ball stud is being displaced in the second direction.

* * * * *